June 23, 1959 L. F. HEVERLY 2,891,749
PIPE SUPPORT
Filed May 17, 1954

INVENTOR,
Lancy F. Heverly
BY Hamilton & Hamilton
Attorneys.

United States Patent Office 2,891,749
Patented June 23, 1959

2,891,749

PIPE SUPPORT

Lancy F. Heverly, Fairway, Kans.

Application May 17, 1954, Serial No. 430,268

6 Claims. (Cl. 248—49)

This invention relates to new and useful improvements in pipe supports, and has particular reference to a pipe support adapted for use during the laying of a pipeline to which a protective coating has been applied.

As a corrosion prevention measure, it is now common practice to apply a protective coating to pipelines for the transportation of oil, gas, gasoline and the like. Such coating usually comprises a layer of coal tar, asphalt or the like applied to the outer surface of the pipe at a high temperature, and having a fibrous binder such as fiberglass therein. A wrapping such as felt is then usually placed about the asphalt or coal tar layer. This protective coating is applied to the pipe after the pipe lengths have been welded together and positioned above the trench in the earth in which it is eventually to be buried.

Difficulty has been experienced in preventing damage to the protective coating between the time it is applied to the pipe and the time it is finally buried. The coating is somewhat fragile, particularly when the asphalt or coal tar is still hot. For this reason, and also because the pipe sections must be welded on to the already completed sections as the pipeline progresses, it is quite common for several hundred yards or more of the coated pipeline to be supported above the trench on skids or timbers laid across the trench. It remains supported on the skids until the coating is thoroughly cooled, and until the work has progressed far enough ahead of a given point that that portion may be lowered into the trench. While it is supported on the skids, the coating may be damaged by high unit loading of the coating by the skid. Damage may also result from mechanical movement between the pipeline and the skids. This movement may result from vibration or other bodily movement of the pipeline caused by manual work being performed at some other point along the pipe, or by thermal expansion and contraction of the pipe during periods of atmospheric cooling or warming. Finally, the protective coating of the pipe may be damaged as the pipe is lowered into the trench, by contact with hard clods of earth, or rocks. The trench may be filled with loose, rock-free earth after the pipe is in place, but this does not protect the coating as the pipe is first lowered into the trench.

It is therefore the principal object of the present invention to provide a pipe support or shoe adapted to be interposed between the coated pipe and each skid, which will largely overcome all of the above possibilities of damage to the pipe coating.

Another object is the provision of a pipe support of the class described which is so cheaply manufactured that it may economically be left secured to the pipe when the skids are removed and the pipe lowered into the trench, whereby to protect the pipe coating from being damaged on the trench floor or walls.

Other objects are extreme simplicity and economy of structure, efficiency and dependability of operation, and ease and convenience of application and use.

With these objects in view, as well as other objects which will appear in the course of the specification, reference will be had to the drawing, wherein.

Figure 1:
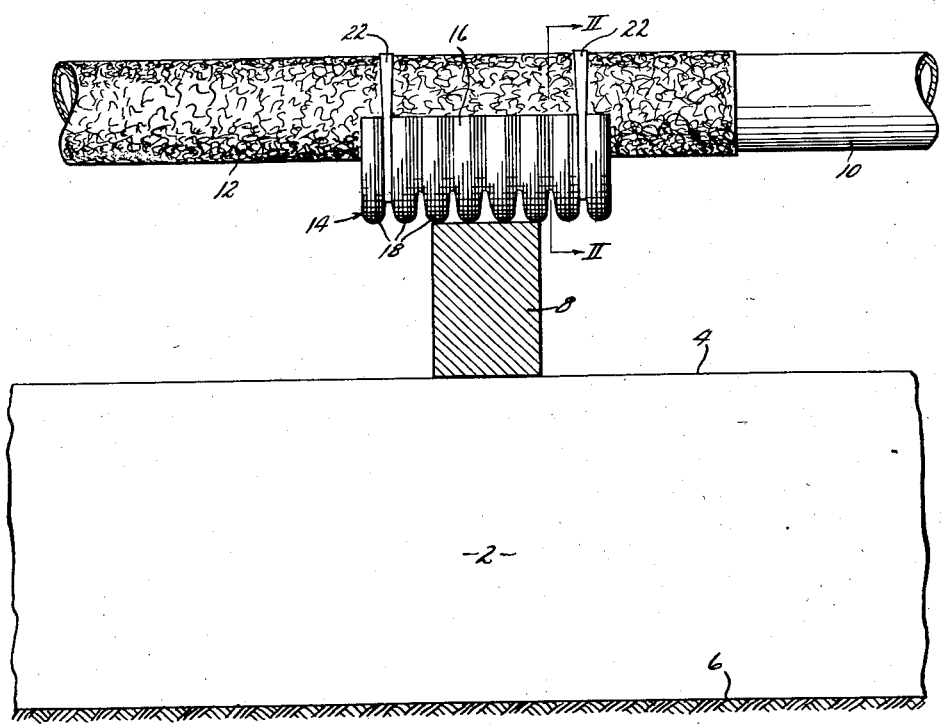
Fig. 1 is a longitudinal section of a portion of a pipeline trench, showing a pipe supported thereabove by means including a support embodying the present invention.

Like reference numerals apply to similar parts throughout the several views, and the numeral 2 applies to a trench formed in the earth, the ground level being indicated at 4, and the floor of the trench at 6. A skid 8, which may be a straight wooden timber, is laid across the trench, the end portions thereof being supported on the ground at each side of the trench. The pipe 10 is disposed longitudinally above the trench, and has a protective coating 12. The coating is not detailed, forming in itself no part of the present invention, but as previously described may comprise a layer of asphalt or coal tar impregnated with fiberglass and covered with a layer of felt.

Figures 2, 3:
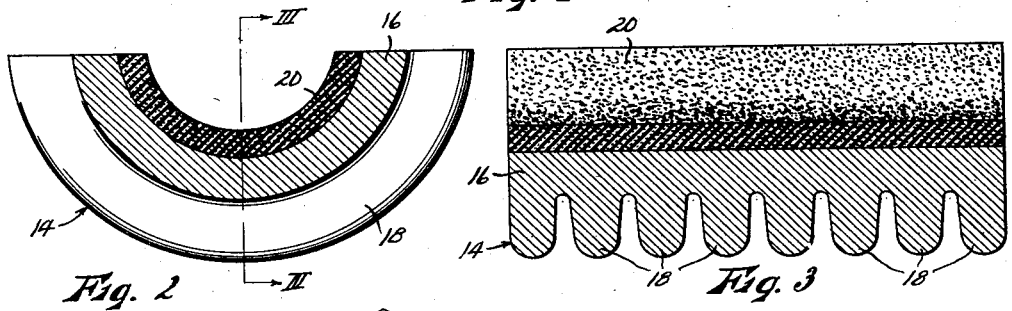
Fig. 2 is an enlarged sectional view of the pipe support only, taken on line II—II of Fig. 1.
Fig. 3 is a sectional view taken on line III—III of Fig. 2.

The covered pipe is supported at each of skids 8, which are disposed at any desired intervals along the trench, by a pipe support 14 interposed therebetween, said pipe support forming the subject matter of this invention. Said pipe support has a rigid, generally semi-cylindrical body portion 16 which may very economically be formed of certain plastic compounds, although it will be apparent that wood, metal, or other suitable materials could be used. It is formed with peripherally extending external ribs 18 integral with the body member. The outer edges of the ribs are rounded in cross-section, as best shown in Fig. 3. The body member is provided with a thick lining layer 20 of resilient, easily tearable material cemented or otherwise secured therein. Sponge rubber has been found very satisfactory, although it is apparent that other suitable materials, such as a cellulose sponge material, or synthetics, might be used. The function of this lining will be more fully described below.

In use, after the covering 12 has been applied to the pipe, a support 14 is placed between the pipe and each skid 8. It will be noted that the support is of slightly less than semi-circular extent, in order that it may be applied to the pipe, substantially concentrically therewith, without undue binding at the sides. Preferably the support is attached directly to the pipe, either by cementing, or as shown by wrapping strips of tape 22 about both the pipe and the support, or by any other convenient means.

It will be noted that since the external surface of the support is cylindrical in form, and substantially coaxial with the pipe, the support need not be placed on the pipe with any great angular accuracy; that is, its midline need not be disposed exactly in a vertical plane through the center of the pipe, since a vertical plane through the center of the pipe is always substantially radial to the support, and the support can engage the skid along any longitudinal line of its outer surface. Prior supports having planar outer surfaces had to be placed with great accuracy, since any angularity between the external surface of the support and the skid would cause the support to tend to turn around the pipe, exerting a torsional stress on the pipe covering, with resultant damage thereto.

The rigidity of the support body causes the pipe load thereon to be distributed evenly, even though the skid may be tilted slightly due to the fact that it rests on uneven ground. When a covered pipe is rested directly on the skids, any slight tilting of the skids, particularly about their own axes, results in the support of the pipe entirely or principally on a corner of the skid. This concentrates the load on a very small area of the pipe, with resultant probability of damage to the pipe covering. In the present device, the load-supporting area of the support is proportioned so that the unit loading thereon is so low as neither to damage the pipe covering, nor to compress the sponge rubber liner to the limit of its yieldability. A load of five pounds per square inch or less has been found satisfactory in most instances, but obviously this figure could be altered if desired.

The remaining resilient yieldability of the liner, after the pipe is supported therein, permits the pipe to vibrate, as when another portion thereof is hammered, without damage to the covering. The support also permits greater movement of the pipe than mere vibrations. The smooth, rounded shape of the external ribs 18 permits the support to slide on skid 8, either longitudinally or transversely of the pipe. However, if the skid resists movement of the support longitudinally of the pipe, due for example to indentation of the skid by the support or to tilting of the skid, then the pipe may move longitudinally in the support by causing tearing or breakage of the sponge rubber. It has been found that sponge rubber of soft or medium texture will tear or rupture before the usual protective pipe covering is damaged. As has been previously stated, however, it is quite possible that materials other than sponge rubber, but possessing the requisite properties of resilience and easy tearability, could be used.

When the skids 8 are removed and the pipe is lowered into the trench, the supports 14 are preferably left attached to the pipe so that they will support the pipe out of contact with the floor and walls of the trench. The pipe covering is often pierced or otherwise damaged by rocks or hard clods of earth. The space immediately around the pipe should then be filled with loose, rock-free soil, this process being known as "padding" the trench. The remainder of the trench may be filled with any available material.

Figure 4:
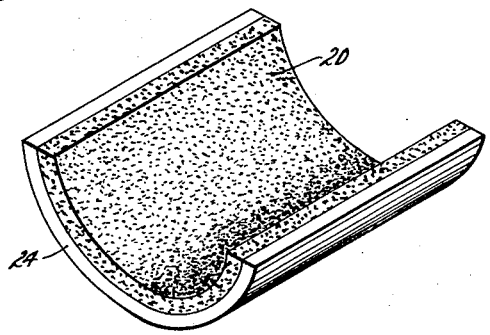
Fig. 4 is a perspective view of a pipe support of slightly modified form.

In the modification shown in Fig. 4, the semicylindrical body portion 24 is relatively thin, and is not provided with external ribs as in Figs. 1 to 3. It would preferably be formed of metal. It operates virtually the same as the species of Figs. 1 to 3, except that due to its radial thinness it is not as well adapted to hold the pipe out of contact with the trench floor. Thus it may be desirable when using this support to place small piles of "benches" of earth in the trench below each support before lowering the pipe into the trench.

While I have shown and described specific embodiments of my invention, it is apparent that minor changes of structure and operation could be made without departing from the spirit of the invention as defined by the scope of the appended claims.

What I claim as new and desire to protect by Letters Patent is:

1. A pipe support comprising a rigid body member of generally cylindrical curvature but of slightly less than semi-cylindrical extent, the inner and outer surfaces of said body member being concentric, the outer surface of said body member being unobstructed whereby to rest in rolling and longitudinally sliding contact with a generally planar foundation support.

2. A pipe support comprising a rigid body member of approximately semi-cylindrical form, both internally and externally, the outer surface of said body member being unobstructed whereby to rest in rolling and longitudinally sliding contact with a generally planar foundation support, and a layer of resiliently yieldable material lining the inner surface of said body member.

3. The structure as set forth in claim 2 wherein said liner layer is formed of an easily torn or ruptured material.

4. The structure as set forth in claim 2 wherein said liner layer comprises a thick pad of sponge rubber.

5. The structure as set forth in claim 2 wherein said body member is formed to present a series of smoothly rounded ribs extending peripherally around the outer surface thereof, and wherein said liner layer comprises a thick pad of sponge rubber.

6. The structure as set forth in claim 2 wherein the outer surface of said body member is smooth and concentric with the inner surface thereof, and wherein said liner layer comprises a thick pad of sponge rubber.

References Cited in the file of this patent

UNITED STATES PATENTS

| | | |
|---|---|---|
| 1,206,938 | Stimmel et al. | Dec. 5, 1916 |
| 1,646,423 | Schaub | Oct. 25, 1927 |
| 2,021,370 | Mallay | Nov. 19, 1935 |
| 2,373,439 | Wheatley | Apr. 10, 1945 |
| 2,458,670 | Young | Jan. 11, 1949 |
| 2,474,920 | Stearns | July 5, 1949 |
| 2,605,786 | Scott | Aug. 5, 1952 |
| 2,650,619 | Pflaumer | Sept. 1, 1953 |
| 2,684,222 | Miller | July 20, 1954 |
| 2,849,027 | Tetyak | Aug. 26, 1958 |